US010480905B2

(12) United States Patent
Sackett

(10) Patent No.: US 10,480,905 B2
(45) Date of Patent: Nov. 19, 2019

(54) PREDICTIVE SEMI-ACTIVE LASER PULSE CORRELATOR AND METHOD

(71) Applicant: Raytheon Company, Waltham, MA (US)

(72) Inventor: James R. Sackett, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1064 days.

(21) Appl. No.: 14/286,776

(22) Filed: May 23, 2014

(65) Prior Publication Data

US 2017/0227329 A1    Aug. 10, 2017

(51) Int. Cl.
| | |
|---|---|
| *G06F 19/00* | (2018.01) |
| *G06G 7/80* | (2006.01) |
| *F41G 7/22* | (2006.01) |
| *H04L 7/04* | (2006.01) |

(52) U.S. Cl.
CPC ........... *F41G 7/226* (2013.01); *F41G 7/2293* (2013.01); *H04L 7/042* (2013.01)

(58) Field of Classification Search
CPC .......... G01S 17/66; G01S 3/784; G01S 3/781; G01C 3/08; F41G 7/2293; F41G 7/226; F41G 7/26; F41G 7/008; F41G 7/2246; F41G 7/2253; F41G 3/145; F41G 7/2213; F41G 7/2266; F41G 9/00; H04L 12/413; H04L 12/4633; H04L 12/66; H04L 25/03834; H04L 25/49; H04L 25/4902; H04L 27/00; H04L 5/0044; H04L 7/042
See application file for complete search history.

(56) References Cited

U.S. PATENT DOCUMENTS

| | | | | |
|---|---|---|---|---|
| 5,023,888 A | * | 6/1991 | Bayston | G01S 7/495 342/189 |
| 2010/0259607 A1 | * | 10/2010 | Kennedy | F41G 7/2253 348/113 |
| 2013/0070239 A1 | * | 3/2013 | Crawford | G01S 17/66 356/139.04 |
| 2013/0153745 A1 | * | 6/2013 | Schmitt | G01S 17/66 250/203.2 |

OTHER PUBLICATIONS

Notification of Transmittal of the International Search Report and the Written Opinion of the International Searching Authority, or the Declaration dated Nov. 5, 2015 in connection with International Patent Application No. PCT/US2015/021539.

* cited by examiner

*Primary Examiner* — Thien T Mai

(57) ABSTRACT

A predictive semi-active laser (SAL) pulse correlator includes a history buffer, a correlation predictor, a match identifier and a correlation verifier. The history buffer is configured to store an indicator for each of a plurality of received pulses. The correlation predictor is configured to initiate a search of the history buffer for a pulse train match for a future interval and to predict correlation for the future interval when the pulse train match is found. The match identifier is configured to search the history buffer for a specified number of pulse matches corresponding to the pulse train match. The correlation verifier is configured to verify correlation by receiving a pulse during the future interval when the correlation predictor predicts correlation for the future interval.

20 Claims, 3 Drawing Sheets

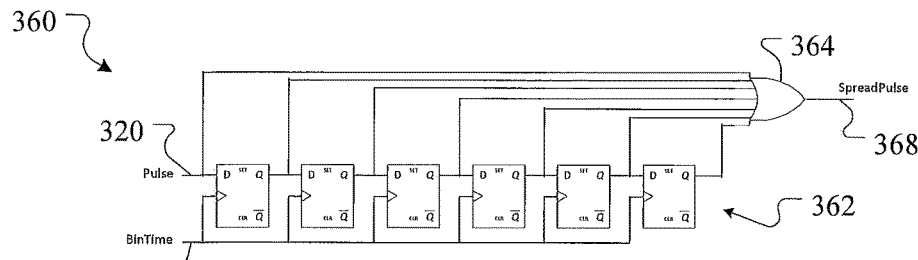
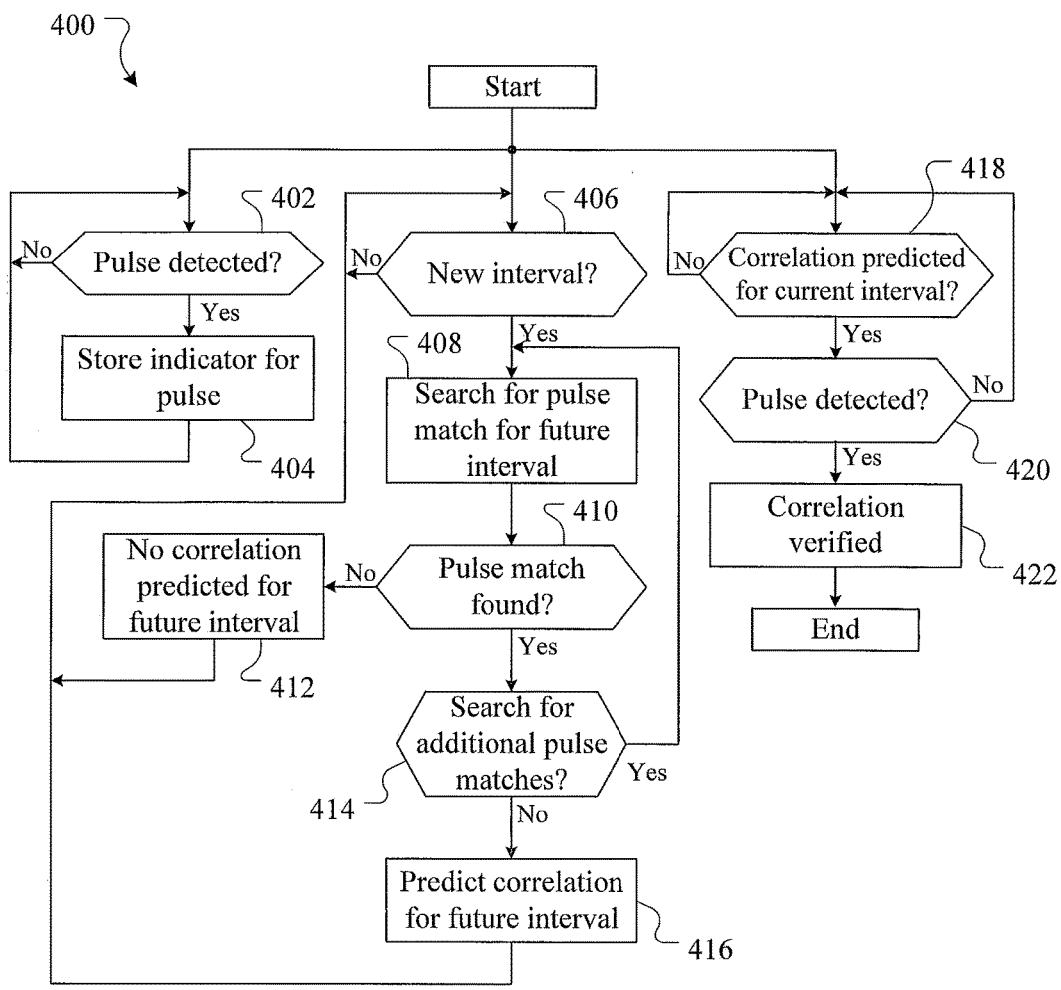
FIG. 4
FIG. 5

PREDICTIVE SEMI-ACTIVE LASER PULSE CORRELATOR AND METHOD

TECHNICAL FIELD

The present disclosure is directed, in general, to laser technology in weapons systems and, more specifically, to a predictive semi-active laser (SAL) pulse correlator and method.

BACKGROUND

Conventional SAL pulse systems used for guiding munitions include a SAL designator that can identify a target for a guided munition. Some of these SAL designators use pulse repetition frequency modulation to identify the target for a receiver at the guided munition. The receiver includes a SAL pulse correlator that is used to differentiate a desired pulse train emitted by the designator from competing pulses that are not aligned to the same repetition frequency. Typical SAL pulse correlators are relatively large, heavy, power inefficient and expensive, making them impractical for use in small, low-cost guided munitions.

SUMMARY

This disclosure provides a predictive semi-active laser (SAL) pulse correlator and method.

In one embodiment, a predictive SAL pulse correlator includes a history buffer, a correlation predictor, a match identifier and a correlation verifier. The history buffer is configured to store an indicator for each of a plurality of received pulses. The correlation predictor is configured to initiate a search of the history buffer for a pulse train match for a future interval and to predict correlation for the future interval when the pulse train match is found. The match identifier is configured to search the history buffer for a specified number of pulse matches corresponding to the pulse train match. The correlation verifier is configured to verify correlation by receiving a pulse during the future interval when the correlation predictor predicts correlation for the future interval.

In another embodiment, a predictive SAL pulse correlator includes a circular buffer, a master state machine, a successive approximation (SA) state machine and an AND gate. The circular buffer is configured to store a timestamp at a corresponding address for each of a plurality of received pulses. The master state machine is configured to initiate a search of the circular buffer for a pulse train match for a future interval and to predict correlation for the future interval when the pulse train match is found. The SA state machine is configured to search the circular buffer for a specified number of pulse matches corresponding to the pulse train match. The AND gate is configured to verify correlation by receiving a pulse during the future interval when the master state machine predicts correlation for the future interval.

In yet another embodiment, a method for performing correlation for a SAL system includes storing an indicator for each of a plurality of received pulses. The method also includes searching the indicators for a pulse train match for a future interval. The method further includes predicting correlation for the future interval when the pulse train match is found. In addition, when correlation is predicted for the future interval, the method includes verifying correlation by receiving a pulse during the future interval.

Other technical features may be readily apparent to one skilled in the art from the following figures, descriptions, and claims.

BRIEF DESCRIPTION OF THE DRAWINGS

For a more complete understanding of the present disclosure, reference is now made to the following description taken in conjunction with the accompanying drawings, in which:

FIG. 4 illustrates an indicator spreader for use in the predictive correlator of FIG. 1 or 2 in accordance with an embodiment of the present disclosure; and FIG. 5 is a flowchart illustrating a method for performing correlation for a SAL system using the predictive correlator of FIG. 1, 2 or 3 in accordance with an embodiment of the present disclosure.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented using any number of techniques, whether currently known or not. Additionally, the drawings are not necessarily drawn to scale.

Figure 1:
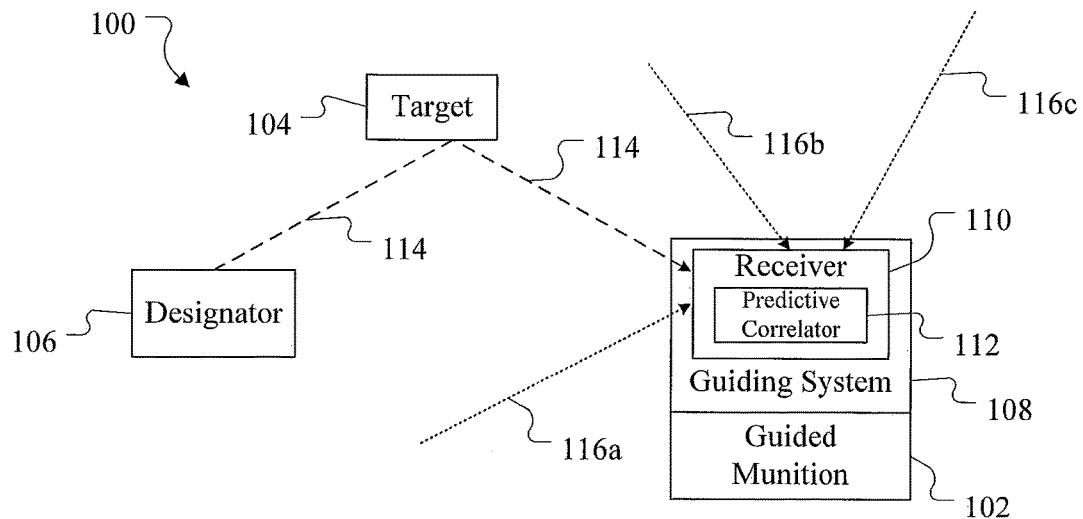
FIG. 1 illustrates a semi-active laser (SAL) system in accordance with an embodiment of the present disclosure.

FIG. 1 illustrates a semi-active laser (SAL) system 100 in accordance with an embodiment of the present disclosure. The embodiment of the SAL system 100 shown in FIG. 1 is for illustration only. Other embodiments of the SAL system 100 could be used without departing from the scope of this disclosure.

In the illustrated embodiment, the SAL system 100 includes a guided munition 102, a target 104, a SAL designator 106 and a guiding system 108. The guided munition 102 may include a mortar, shell, bomb, missile or other suitable type of munition. The guiding system 108, which is coupled to or included within the guided munition 102, includes a receiver 110 having a predictive SAL pulse correlator or predictive correlator 112. In addition to the receiver 110, it will be understood that the guiding system 108 includes other components not shown in FIG. 1.

The target 104 represents a physical object, such as a building, weapon, or the like, toward which the guided munition 102 is guided by the guiding system 108. The designator 106 is configured to emit a train of laser pulses 114 at the target 104 in order to identify the target 104 for the guiding system 108. To accomplish this, the designator 106 is configured to use pulse repetition frequency (PRF) modulation. That is, the designator 106 is configured to emit the laser pulses 114 at a specified frequency that can be used to identify the designator 106 as the source of the laser pulses 114.

The laser pulses 114 emitted from the designator 106 are reflected off the target 104, and the reflected laser pulses 114 are received at the receiver 110. Other spurious laser pulses 116a-116c may also be received at the receiver 110. For example, a first spurious laser pulse 116a may be received from a different designator using a different frequency, a second spurious laser pulse 116b may be caused by intentional interference such as a jammer, and a third spurious laser pulse 116c may be caused by natural interference. As a result, the receiver 110 may receive multiple laser pulses 114 and 116a-116c from multiple sources.

In some embodiments, the laser pulses 114 are evenly-spaced pulses that can be differentiated from the spurious laser pulses 116a-116c based on the frequency associated with the designator 106. Thus, the predictive correlator 112 is configured to analyze the incoming laser pulses 114 and 116a-116c and to differentiate the laser pulses 114 from any competing spurious laser pulses 116a-116c that are not aligned to the same repetition frequency. In this way, the guiding system 108 may determine the location of the target 104 based on the direction and angles associated with the laser pulses 114 identified by the predictive correlator 112.

Conventional SAL correlators are typically based on a large memory or on a processor with a smaller memory. For SAL correlators using a large memory, a history buffer is included that is a relatively large memory capable of holding a bit for each of a plurality of small time intervals, such as about 2 μs. Thus, regardless of whether or not a pulse occurs, a bit is stored for each time interval, with one value of the bit indicating a pulse occurred and another value of the bit indicating no pulse occurred during that time interval. For these embodiments, the SAL correlator responds to an incoming pulse by searching backwards through the history buffer for matching pulses at the proper repetition frequency.

For SAL correlators using a processor with a smaller memory, the history buffer is smaller than the large history buffers used without processors, but a microprocessor is required to analyze the data in the smaller history buffer. As one example of this approach, software responds to a received pulse by scheduling a time in the future to look for a next pulse at the desired interval. If the next pulse is found, the software may declare a match or schedule to look for another future pulse (when more than two pulses are required to correlate). If the pulse is not found, that possible correlation track is dropped. There is usually a limit of a small number of possible correlation tracks. As another example of this approach, a timestamp is stored for each received pulse. When a pulse is received, software searches backwards in time linearly until a match is found or until the timestamps indicate that the time for a matching pulse has been passed.

Each of these conventional methods involves significant hardware resources and delays from the time a pulse is received until a correlation may be found. Since a pulse correlation is examined for line of sight and other parameters, the correlation delay also results in a need for storage of pulse information for incoming pulses received while the pulse correlation is being processed. Thus, additional memory and processing capability are needed to avoid falling behind in storing and processing these incoming pulses.

For the SAL system 100, the predictive correlator 112 includes a history buffer that is configured to store an indicator, such as a timestamp or a specified bit value, for each received pulse 114 or 116a-116c. The predictive correlator 112 is configured with a predictable maximum latency time for a search of the indicators stored in the history buffer. Therefore, the predictive correlator 112 is configured to predict correlation for a future interval by searching for matches for the future interval during a current interval that is sufficiently long to allow for the search for matches as determined by the predictable maximum latency time.

Thus, prior to a future interval, the predictive correlator 112 may be configured to search the history buffer to decide if prior pulses 114 or 116a-116c can be found spaced at the pulse repetition frequency corresponding to that future interval. Because of the accuracy limits of the timing of the SAL system 100, the predictive correlator 112 is configured to consider a window of time around each pulse rather than an exact instant in the search for matches. If a specified number of prior matching pulses 114 or 116a-116c is found, the predictive correlator 112 is configured to set a predictive flag during the future interval. If the predictive flag has been set, any pulse 114 received during that interval indicates that the number of aligned pulses 114 required to declare correlation has been detected. Therefore, the predictive correlator 112 is configured to declare correlation upon receipt of the final pulse 114 without further delay.

By allowing for the immediate processing of further pulse information, this substantially instantaneous correlation verification reduces storage needed by the predictive correlator 112 because information does not need to be stored for the final pulse 114 or for additional incoming pulses 114 or 116a-116c received after correlation is verified. Also, the predictive correlator 112 may be implemented with simple state machines and adders as described in more detail below in connection with FIG. 3. For example, the predictive correlator 112 may be implemented in a mixed signal application-specific integrated circuit (ASIC) or a field-programmable gate array (FGPA). In a particular embodiment, the predictive correlator 112 may have a footprint of about 0.1% of the smallest parts in modern full-featured FPGA families. Therefore, the predictive correlator 112 can be made relatively small and at a relatively low cost. For instance, the predictive correlator 112 may be small enough and inexpensive enough to be used in a guided munition 102 such as a mortar shell or grenade.

Although FIG. 1 illustrates one example of a SAL system 100, various changes may be made to the embodiment shown in FIG. 1. For example, the makeup and arrangement of the SAL system 100 are for illustration only. Components could be added, omitted, combined, subdivided, or placed in any other suitable configuration according to particular needs. In addition, although described as part of a military targeting system, it will be understood that the SAL system 100 may be used in any other suitable type of application in which a designator 106 uses PRF modulation to identify a target 104 or other object for a receiver 110. As a particular example, in a group of toy vehicles (such as remote-controlled cars or helicopters) with each vehicle self-designating by flashing a different PRF, a predictive correlator 112 could be used to identify a specific one of the toy vehicles for each controller. As another particular example, race cars or helmet beacons (such as football or other sports helmet beacons) may each flash a different PRF, allowing a predictive correlator 112 for each one to identify a driver or player, thereby allowing information about the driver or player to be automatically displayed for viewers of the corresponding event. For each of these types of embodiments, the designator 106 may be coupled to or included as part of the target 104. Also, for these types of embodiments in which nothing is being guided to the target 104, the guided munition 102 and the guiding system 108 may be omitted, and the receiver 110 may be a stand-alone receiver or part of another suitable component.

Figure 2:
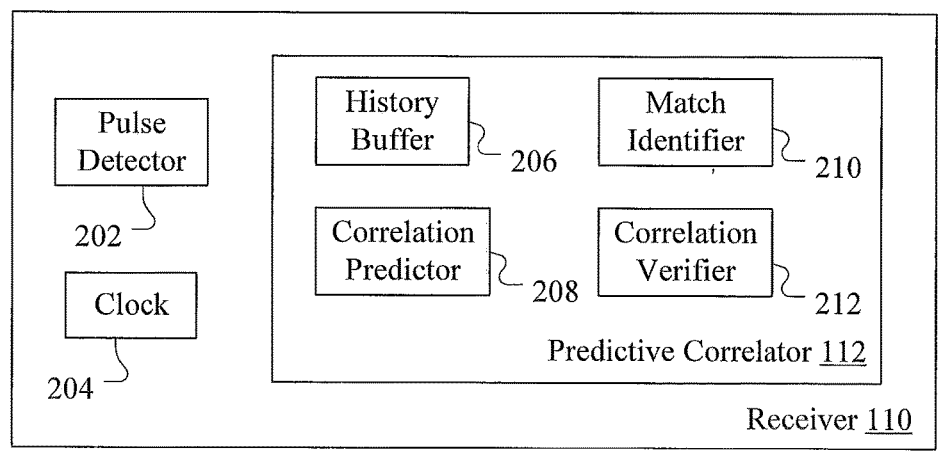
FIG. 2 illustrates a block diagram of the receiver of FIG. 1 in accordance with an embodiment of the present disclosure.

FIG. 2 illustrates a block diagram of the receiver 110 of FIG. 1 in accordance with an embodiment of the present disclosure. The embodiment of the receiver 110 shown in FIG. 2 is for illustration only. Other embodiments of the receiver 110 could be used without departing from the scope of this disclosure.

In the illustrated embodiment, in addition to the predictive correlator 112, the receiver 110 includes a pulse detector 202 and a clock 204. The predictive correlator 112 also includes a history buffer 206, a correlation predictor 208, a match identifier 210, and a correlation verifier 212. It will be understood that both the receiver 110 and the predictive correlator 112 may include additional components not shown in FIG. 2.

The pulse detector 202 is configured to detect pulses 114 and 116a-116c and to generate a "pulse detected" signal when a pulse 114 or 116a-116c is detected. The clock 204 is configured to generate a time signal. Each time a pulse 114 or 116a-116c is detected by the pulse detector 202 as indicated by the generation of the pulse detected signal, the history buffer 206 is configured to store an indicator for the pulse 114 or 116a-116c. For example, for some embodiments, the history buffer 206 may store a timestamp corresponding to the time signal generated by the clock 204 at the time at which the pulse 114 or 116a-116c is detected. For another example, for some embodiments, the history buffer 206 may store a specified bit value in one or more bins corresponding to the time at which the pulse 114 or 116a-116c is detected.

The correlation predictor 208 is configured to initiate a search for a pulse train match for a future interval. The match identifier 210 is configured to search for pulse matches corresponding to the pulse train match. The correlation verifier 212 is configured to verify that correlation has been found when a pulse train match has been found by the correlation predictor 208 and when a pulse 114 corresponding to the pulse train match is detected by the pulse detector 202.

As used here, a "pulse match" refers to the identification of an indicator in the history buffer 206 that corresponds to the frequency used by the designator 106, assuming that a pulse 114 will be received within a future interval. For example, for some embodiments, if the match identifier 210 finds a timestamp in the history buffer 206 that is the equivalent of the difference between the time for the future interval and the length of the period that corresponds to the frequency of the laser pulses 114 emitted by the designator 106 (or a multiple of the period), the match identifier 210 finds a pulse match. For another example, for some embodiments, if the match identifier 210 finds a specified bit value in a time bin of the history buffer 206 corresponding to the time difference between the future interval and the length of the period that corresponds to the frequency of the laser pulses 114 emitted by the designator 106 (or a multiple of the period), the match identifier 210 finds a pulse match.

A "pulse train match" exists when the match identifier 210 has found a specified number of pulse matches as determined by the correlation predictor 208. The specified number of pulse matches corresponding to a pulse train match is one less than the number of pulses 114 desired for verification of correlation. For example, in some embodiments, the predictive correlator 112 may be configured to verify that laser pulses 114 received at the receiver 110 are from the designator 106 when three matching pulses 114 are found or when four matching pulses 114 are found. However, it will be understood that the predictive correlator 112 may be configured to use any suitable number of matching pulses 114 to verify correlation. For the embodiments in which three matching pulses 114 are used, for example, a pulse train match exists when two pulse matches are found.

A "future interval" represents an interval for which the predictive correlator 112 may predict correlation by finding a pulse train match for that interval. The correlation verifier 212 may verify the predicted correlation by detecting a final pulse 114 during the future interval (such as by receiving a pulse detected signal from the pulse detector 202). A "current interval" represents an interval in which a search for a pulse train match for a future interval is performed and also an interval in which the detection of a final pulse 114 verifies correlation if a pulse train match for the current interval was previously found. In some embodiments, the future interval may include the interval immediately following the current interval.

As described in more detail below in connection with FIG. 3, the match identifier 210 is configured to perform a search for a pulse match within a predefined maximum amount of time. Thus, each interval includes at least the predefined maximum amount of time multiplied by the specified number of pulse matches that make up a pulse train match, thereby ensuring that the match identifier 210 has enough time to complete the pulse match searches during a single interval.

Although FIG. 2 illustrates one example of a receiver 110, various changes may be made to the embodiment shown in FIG. 2. For example, the makeup and arrangement of the receiver 110 are for illustration only. Components could be added, omitted, combined, subdivided, or placed in any other suitable configuration according to particular needs.

Figure 3:
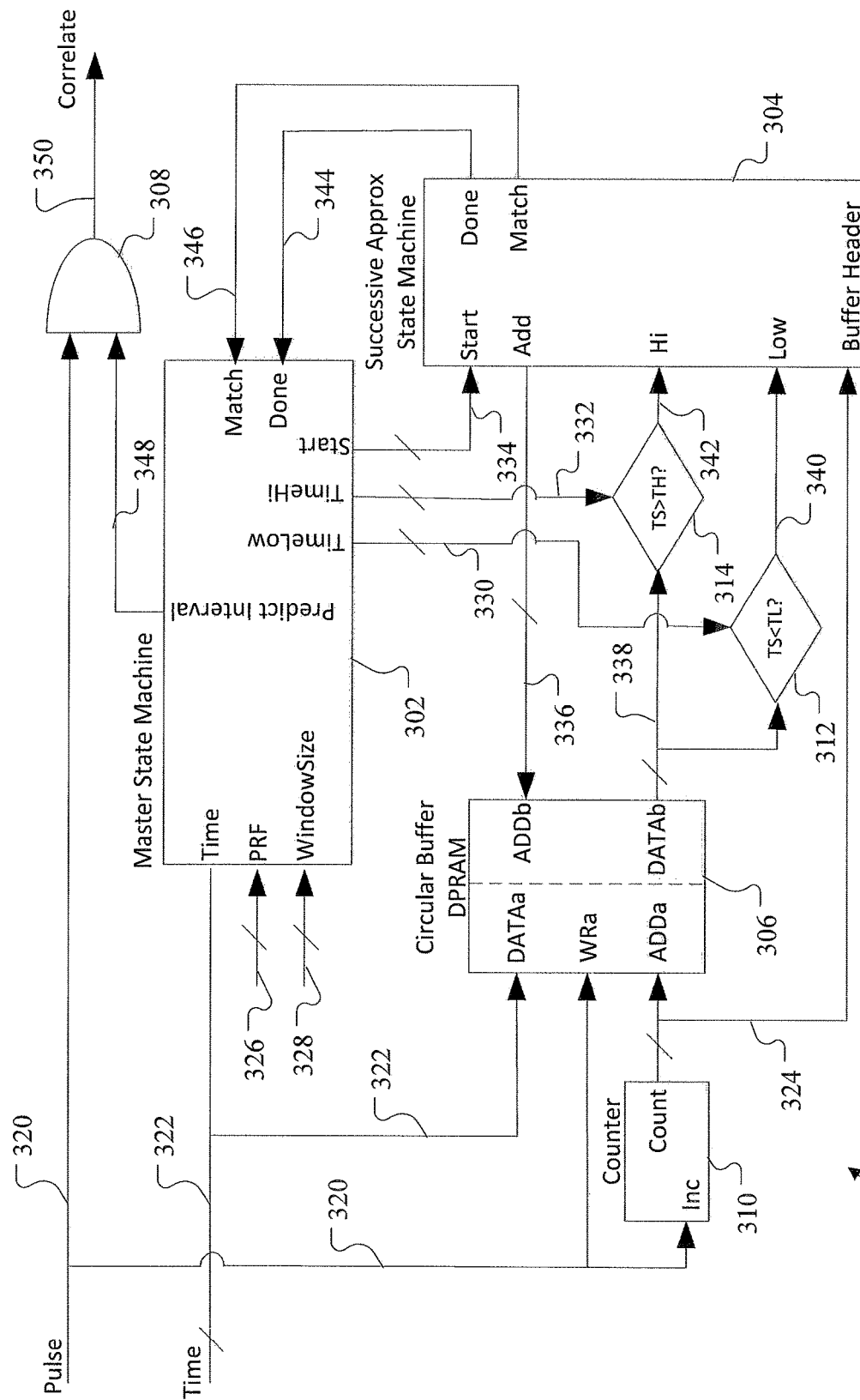
FIG. 3 illustrates details of the predictive correlator of FIG. 1 or 2 in accordance with an embodiment of the present disclosure.

FIG. 3 illustrates details of the predictive correlator 112 of FIG. 1 or 2 in accordance with an embodiment of the present disclosure. The embodiment of the predictive correlator 112 shown in FIG. 3 is for illustration only. Other embodiments of the predictive correlator 112 could be used without departing from the scope of this disclosure.

In the illustrated embodiment, the predictive correlator 112 includes a master state machine 302, a successive approximation (SA) state machine 304, a circular buffer dual-port random access memory (DPRAM) 306, an AND gate 308, a counter 310, a low comparator 312 and a high comparator 314. The master state machine 302 may correspond to the correlation predictor 208 of FIG. 2, the SA state machine 304 and the comparators 312 and 314 may correspond to the match identifier 210 of FIG. 2, the circular buffer DPRAM 306 may correspond to the history buffer 206 of FIG. 2, and the AND gate 308 may correspond to the correlation verifier 212 of FIG. 2.

In this embodiment, the predictive correlator 112 is configured to receive a pulse detected signal 320 from the pulse detector 202 when a pulse 114 or 116a-116c is received at the receiver 110. In addition, the predictive correlator 112 is configured to receive a time signal 322 from the clock 204. In some embodiments, the time signal 322 may include a 32-bit vector counting up in microseconds. However, it will be understood that the time signal 322 may be implemented in any other suitable manner. The circular buffer DPRAM (buffer) 306, the AND gate 308, and the counter 310 are each configured to receive the pulse detected signal 320, and the master state machine 302 and the buffer 306 are each configured to receive the time signal 322.

When a pulse 114 or 116a-116c is detected, the buffer 306 is configured to receive the pulse detected signal 320 as a write signal (WRa). Based on the write signal, the buffer 306 is configured to store the time signal 322 as a timestamp (DATAa) at its current address (ADDa). The buffer 306 is configured to store a relatively small number of timestamps.

For example, in a particular embodiment, the buffer 306 may be configured to store up to 256 timestamps. The number of timestamps that may be stored in the buffer 306 may be based on the total number of pulses 114 or 116a-116c that might be expected to occur during the PRF time multiplied by the number of pulses 114 in a pulse train.

The counter 310 is configured to receive the pulse detected signal 320 and to increment a count 324 in response to the pulse detected signal 320. The counter 310 is also configured to provide the count 324 to the buffer 306 to increment the current address (ADDa) for storing a timestamp for a subsequent pulse 114 or 116a-116c, as well as to provide the count 324 to the SA state machine 304 to be used as a buffer header during a search as described in more detail below.

In addition to the pulse detected signal 320, the master state machine 302 is configured to receive a PRF signal 326 that indicates the frequency of laser pulses 114 emitted by the designator 106 and a WindowSize signal 328 that indicates the size of a time window to be searched for a pulse match. While the designator 106 is configured to generate pulses 114 at the desired PRF, the designator 106 has a physical accuracy limit as to how close the pulses 114 can be to the exact timing desired. Thus, because of the accuracy limit of the designator 106, any pulses 114 or 116a-116c received during the time window may be assumed to be from the designator 106.

However, as the size of the time window increases, the probability of finding a spurious laser pulse 116a-116c during the time window also increases. Thus, for some embodiments, the size of the time window may be variable. As described above, the time window allows for inaccuracies, such as inaccuracies between the clocks of the designator and the receiver (i.e., drift), as well as due to the unpredictable small delay when a laser is fired (i.e., jitter). Jitter is a constant and accounts for a small part of the time window. Drift, however, is cumulative. For one PRF period in the past, the difference between where a pulse 114 is expected compared to where the pulse 114 may be found may be represented by a time t. However, for two PRF periods in the past, the difference may be 2t. Thus, the drift can account for a shift of n*t, where n is the number of PRF periods in the past at which a search is being conducted. Therefore, for some embodiments, the size of the time window may be a static amount that accounts for a worst case drift of a historic pulse 114 plus the constant jitter. However, for other embodiments, to reduce the findings of spurious laser pulses 116a-116c during a correlation, the size of the time window may be variable depending on the age of the pulse 114 for which a search is being performed.

The master state machine 302 is also configured to identify a start of each interval based on the time signal 322. In some embodiments, the master state machine 302 may identify the start of a new interval when each of a specified number of least significant bits of the time signal 322 is zero. For example, in a particular embodiment, the time signal 322 may include a digital signal that is incremented for each 1 μs of time, and each interval may represent 32 μs. In this embodiment, the master state machine 302 may identify a new interval each time the five least significant bits of the time signal 322 are zero. However, it will be understood that the master state machine 302 may identify the start of an interval in any other suitable manner. For example, the start of an interval may be identified by determining when the time signal 322 is evenly divisible by a specified interval value. For another example, the start of an interval may be identified when a second interval timer reaches a terminal count.

The master state machine 302 is also configured to determine the time window for searching for a pulse match based on the time signal 322, the PRF signal 326 and the WindowSize signal 328. For example, for a future interval (the interval immediately following the current interval), the master state machine 302 may add the interval length to the current time to obtain a time associated with the future interval and then subtract the period corresponding to the PRF from that time to determine the time at which a pulse match may be expected. The master state machine 302 may then determine the time window by subtracting a first portion and adding a second portion of the window size to the result to generate a TimeLow 330 and a TimeHi 332, respectively. In some embodiments, the first and second portions may each be half.

Along with generating the TimeLow 330 and TimeHi 332, the master state machine 302 is also configured to generate a Start signal 334 for the SA state machine 304. When the Start signal 334 is received, the SA state machine 304 is configured to search for a pulse match (such as a timestamp corresponding to a pulse 114 or 116a-116c) between the TimeLow 330 and the TimeHi 332. If the SA state machine 304 finds a timestamp within that time window, a pulse match has been found. To do this, the SA state machine 304 is configured to determine a starting point for searching the buffer 306 for a pulse match. In some embodiments, the SA state machine 304 may be configured to determine this starting point by adding half the buffer size to the address at which a timestamp was most recently stored. Thus, the SA state machine 304 may add half the buffer size to the buffer header, which corresponds to the most recent count 324 provided by the counter 310 that identifies a current address (ADDa) of the buffer 306. The SA state machine 304 may then generate an address signal (Add) 336 representing the result for the buffer 306.

The buffer 306 is configured to receive the address signal (ADDb) 336 and to output a timestamp (DATAb) 338 corresponding to the timestamp stored at the address indicated by the address signal 336. The low comparator 312 is configured to determine whether the timestamp (TS) 338 corresponds to a time before TimeLow (TL) 330. If so, the low comparator 312 is configured to generate a low signal 340 for the SA state machine 304 to indicate that the address signal 336 is too low (for example, the low signal 340 may be a one). Similarly, the high comparator 314 is configured to determine whether the timestamp 338 corresponds to a time after TimeHi (TH) 330. If so, the high comparator 314 is configured to generate a high signal 342 for the SA state machine 304 to indicate that the address signal 336 is too high (for example, the high signal 342 may be a one).

If the low signal 340 indicating the address signal 336 is too low is received at the SA state machine 304, the SA state machine 304 is configured to determine a subsequent address (Add) for the address signal 336 by adding ¼ of the buffer size to the previously generated address. Similarly, if the high signal 342 is received at the SA state machine 304, the SA state machine 304 is configured to determine a subsequent address for the address signal 336 by subtracting ¼ of the buffer size to the previously generated address.

The buffer 306 is then configured to output a subsequent timestamp (DATAb) 338 corresponding to the timestamp stored at the newly generated address (ADDb) indicated by the updated address signal 336. The comparators 312 and 314 are configured to compare the subsequent timestamp 338 to TimeLow 330 and TimeHi 332 and to generate the low signal 340 or the high signal 342 if indicated based on the comparisons. If the search will continue because the timestamp 338 is still too low or too high, the SA state machine 304 is configured to add or subtract decreasing portions of the buffer size for each search. That is, as the first search uses ½ of the buffer size and the second search uses ¼ of the buffer size, subsequent searches may use ⅛ of the buffer size, followed by 1/16, 1/32, 1/64, 1/128 and so on. In an embodiment in which the buffer 306 is configured to store up to 256 timestamps, the entire buffer 306 is known to have been searched when 1/128 of the buffer size is added or subtracted. Thus, in this embodiment, if no match is found after adding or subtracting 1/128 of the buffer size, the SA state machine is configured to generate a Done signal 344 for the master state machine 302 to indicate that there is no pulse match. In this way, the maximum time for an exhaustive search can be determined based on the amount of time used to perform a search and the maximum number of searches for the buffer size. An interval length may then be determined based on the maximum time for an exhaustive search and the specified number of pulse matches in a pulse train match.

If a search is performed and the low comparator 312 indicates that the timestamp 338 is not too low and the high comparator 314 indicates that the timestamp 338 is not too high (such as if the low signal 340 and the high signal 342 are each zero), the SA state machine 304 has found a pulse match for any pulses 114 or 116a-116c received in the future interval. In this case, the SA state machine 304 is configured to generate a Match signal 346 for the master state machine 302.

If the master state machine 302 receives a Done signal 344 from the SA state machine 304, no pulse train match has been found, and the search ends with no correlation predicted for the future interval. However, if the master state machine 302 receives a Match signal 346 from the SA state machine 304, the master state machine 302 is configured to determine whether to search for additional pulse matches in order to verify a pulse train match. That is, if fewer pulse matches have been found by the SA state machine 304 than are used to indicate a pulse train match, the master state machine 302 may initiate a subsequent search for another pulse match previous' to the most recently identified pulse match. For example, the master state machine 302 may subtract a multiple of the PRF (beginning with twice the PRF, then three times the PRF, etc.) from the interval length added to the current time to determine the time at which another pulse match may be expected. In some embodiments, the master state machine 302 may then determine a time window by subtracting and adding half the window size to the result, which generates a new TimeLow 330 and a new TimeHi 332. The SA state machine 304 may then search for another pulse match between the new TimeLow 330 and the new TimeHi 332.

Finally, if the master state machine 302 has received a number of Match signals 346 from the SA state machine 304 corresponding to the number of pulse matches in a pulse train match, the master state machine 302 is configured to predict a correlation for the future interval. Thus, in the illustrated embodiment, the master state machine 302 is configured to identify the future interval based on the time signal 322 and, when the future interval arrives, to generate a PredictInterval signal 348 during that interval (in this case, the PredictInterval signal 348 may be a one). As a result, the AND gate 308 receives the PredictInterval signal 348 for the duration of the interval such that if a pulse detected signal 320 is received during that interval, the AND gate 308 is configured to generate a correlate signal 350 indicating the identification of a verified pulse train of laser pulses 114 emitted by the designator 106. Therefore, no additional processing or delay is needed when the final laser pulse 114 is detected in order to verify correlation. Instead, as soon as the pulse detected signal 320 is passed through the AND gate 308, the correlate signal 350 is generated and correlation is confirmed.

Therefore, the predictive correlator 112 significantly reduces the amount of memory required by up to several orders of magnitude. An efficient search algorithm determines if a historical pattern of pulses is in place to declare a correlation should a new pulse occur in an upcoming interval. Thus, since the correlation has been predicted or pre-qualified prior to an interval, a detection is provided without any further processing should a pulse occur in the interval. In this way, a predictive correlator 112 may be provided without using a processor, software or a large memory. Accordingly, the predictive correlator 112 is small, fast and efficient, which helps to reduce or minimize the size, weight, power and cost of the system in which it is implemented.

Although FIG. 3 illustrates one example of a predictive correlator 112, various changes may be made to the embodiment shown in FIG. 3. For example, the makeup and arrangement of the predictive correlator 112 are for illustration only. Components could be added, omitted, combined, subdivided, or placed in any other suitable configuration according to particular needs.

FIG. 4 illustrates an indicator spreader 360 for use in the predictive correlator 112 in accordance with an embodiment of the present disclosure. The indicator spreader 360 shown in FIG. 4 is for illustration only. Other embodiments of the indicator spreader 360 could be used without departing from the scope of this disclosure.

The indicator spreader 360 includes a shift register 362 and an OR gate 364. For the illustrated embodiment, the shift register 362 includes six flip flops. However, it will be understood that the shift register 362 may include any suitable number of flip flops. For some embodiments, the indicator spreader 360 may be part of a predictive correlator 112 that includes a relatively large memory history buffer 206 that is a capable of holding a bit for each of a plurality of small time intervals, or "bins," (e.g., 2 μs). Thus, regardless of whether or not a pulse occurs, a bit is stored in each bin, with one value of the bit indicating a pulse occurred and another value of the bit indicating no pulse occurred during or near the time interval corresponding to that bin, as described below.

Using a relatively large history buffer 206 in this manner, a search for a pulse match may be completed in less time than a search performed using the SA state machine 304 since the historic time periods can be calculated directly. That is, exactly where in memory a certain pulse 114 in the past would have been captured is known. By completing the search faster, the time intervals can be narrower, which would be an advantage if the designator 106 was of a relatively high quality. Thus, if precisely where to look is known, the search can be completed in a much shorter time using a large history buffer 206. However, even though exactly where to look may be known, in practice this search may not actually be faster than the search performed by the SA state machine 304 since a time window, not just a particular instant in the past, is searched to account for inaccuracies.

Therefore, the indicator spreader 360 is configured to store an indicator for each of the incoming pulses 114 and 116a-116c in multiple bins. That is, the indicator spreader 360 is configured to store an indicator, which is a specified bit value, in each of a plurality of bins to indicate that a single pulse 114 or 116a-116c has been received. To do this, the indicator spreader 360 includes a shift register 362 that includes a number of flip flops corresponding to the length of the time window needed. The outputs of the flip flops are ORed together through the OR gate 364 to determine if a memory location should have a '1' or a '0' written to it.

As shown in the illustrated embodiment, the indicator spreader 360 is configured to receive a pulse detected signal 320 from the pulse detector 202 when a pulse 114 or 116a-116c is received and a BinTime input 366, which occurs once per bin (e.g., once every 2 μs). The BinTime input 366 clocks in the pulse detected signal 320 and shifts all the values in the shift register 362. The indicator spreader 360 is also configured to output a SpreadPulse signal 368. The SpreadPulse signal 368 represents a spread out pulse 114 or 116a-116c that is stored once per bin time at the current time interval to the history buffer 206. Thus, when a pulse 114 or 116a-116c is detected, the indicator (e.g., a one) is stored in the current bin and in the next n bins, where n is the number of flip flops in the shift register 362 (e.g., six in the illustrated embodiment).

When the match identifier 210 searches for a pulse match, the match identifier 210 may calculate the exact bin where the pulse 114 is expected to be and search for the indicator in a bin that is half the time window size (as measured in bins) later. If a pulse 114 or 116a-116c occurred anywhere from half a time window size early to half a time window size late, that bin will include the indicator. Therefore, the match identifier 210 may search the entire time window by checking a single bin location for the indicator.

For some embodiments, if the history buffer 206 is large enough, multiple indicator spreaders 360 may be implemented, with each indicator spreader 360 having a different length to account for varying time window sizes. Also, separate memories may be implemented for each time window width in the history buffer 206. Alternatively, the time windows could be combined into nibbles at a bin time where each nibble is made from one bit for each window width. The match identifier 210 may search for a pulse match by selecting from one of the different memories or the bits within the nibble to get the desired time window width (i.e., wider widths for older pulses, as described above).

FIG. 5 is a flowchart illustrating a method for performing correlation for a SAL system using the predictive correlator 112 of FIG. 1, 2 or 3 in accordance with an embodiment of the present disclosure. The method 400 shown in FIG. 5 is for illustration only. Correlation may be performed for a SAL system in any other suitable manner without departing from the scope of this disclosure.

In the illustrated embodiment, three sub-processes are provided in parallel with each other. For a first of these sub-processes, a determination is made as to whether a pulse 114 or 116a-116c has been detected (step 402). As a particular example, in some embodiments, when a pulse detector 202 detects a pulse 114 or 116a-116c at a receiver 110, the pulse detector 202 generates a pulse detected signal 320. If a pulse 114 or 116a-116c is detected (step 402), an indicator for the pulse 114 or 116a-116c is stored in a history buffer 206 (step 404). As a particular example, in some embodiments, a circular buffer DPRAM 306 stores a timestamp corresponding to the pulse 114 or 116a-116c. As another particular example, in some embodiments, a history buffer 206 stores a specified bit value in a time bin or multiple time bins corresponding to the pulse 114 or 116a-116c. This sub-process continues to repeat such that an indicator is stored for each detected pulse 114 or 116a-116c.

For a second sub-process, a correlation predictor 208 determines whether a new interval has started (step 406). As a particular example, in some embodiments, a master state machine 302 may determine that a new interval has started when a time signal 322 received at the master state machine 302 includes zeroes for a specified number of least significant bits. When a new interval has started (step 406), the correlation predictor 208 initiates a search of the history buffer 206 by a match identifier 210 for a pulse match for a future interval (step 408). As a particular example, in some embodiments, the master state machine 302 may generate a TimeLow signal 330 and a TimeHi signal 332 corresponding to a window in which a pulse match would be expected for a pulse 114 received in a future interval. The master state machine 302 may generate the TimeLow and TimeHi signals 330 and 332 based on the time signal 322, a PRF signal 326, and a WindowSize signal 328. The master state machine 302 may also generate a Start signal 334 for an SA state machine 304. The SA state machine 304 may then perform a successive approximation search for the expected pulse in the buffer 306 within the time window identified by the TimeLow and TimeHi signals 330 and 332. As another particular example, for some embodiments, the match identifier 210 may search for a specified bit value (e.g., a one) in a bin corresponding to the time at which a pulse match is expected. For example, the match identifier 210 may search a bin corresponding to half a time window size later than the expected bin.

If the match identifier 210 finds no pulse match (step 410), the correlation predictor 208 does not predict a correlation for the future interval (step 412). As a particular example, in some embodiments, if the SA state machine 304 does not find a timestamp in the buffer 306 within the time window, the SA state machine 304 may generate a Done signal 344 to signal the master state machine 302 that no match was found. During the corresponding future interval, the master state machine 302 may then generate no PredictInterval signal 348 (for example, the master state machine 302 may set the PredictInterval signal 348 to a zero) to indicate that no correlation is predicted for that interval. For another particular example, in some embodiments, if the match identifier 210 does not find the specified bit value in the searched bin, the correlation predictor 208 does not predict a correlation for the future interval.

If the match identifier 210 finds a pulse match (step 410), the correlation predictor 208 may determine whether the match identifier 210 should search for additional pulse matches (step 414). Thus, the correlation predictor 208 may determine whether or not a specified number of pulse matches has been found for the future interval such that a pulse train match exists. As a particular example, in some embodiments, the SA state machine 304 may generate a Match signal 346 for the master state machine 302 to indicate that a pulse match has been found in the buffer 306. The master state machine 302 may determine how many total pulse matches have been found by the SA state machine 304 for the future interval based on how many Match signals 346 have been received from the SA state machine 304 in pulse match searches.

If not enough pulse matches have been found by the match identifier 210 (step 414), the correlation predictor 208 initiates another search by the match identifier 210 for another pulse match for the future interval (step 408). As a particular example, in some embodiments, if the master state machine 302 determines that the total number of pulse matches found by the SA state machine 304 for the future interval is insufficient for a pulse train match, the master state machine 302 may determine that the SA state machine 304 should search for additional pulse matches. In this case, the master state machine 302 generates an updated TimeLow signal 330 and an updated TimeHi signal 332 corresponding to a next time window in which a pulse match would be expected for a pulse 114 received in the future interval. As another particular example, for some embodiments, the correlation predictor 208 may determine a subsequent bin for the match identifier 210 to search for another pulse match.

If enough pulse matches to make up a pulse train match have been found by the match identifier 210 (step 414), the correlation predictor 208 predicts a correlation for the future interval (step 416). As a particular example, in some embodiments, if a pulse train match exists, the master state machine 302 may generate the PredictInterval signal 348 for the AND gate 308 during the future interval (for example, the master state machine 302 may set the PredictInterval signal 348 to a one). This sub-process continues to repeat for each successive interval.

For a third sub-process, the correlation predictor 208 determines whether a correlation is predicted for the current interval (step 418). As a particular example, in some embodiments, the master state machine 302 may determine whether a correlation is predicted for the current interval based on a pulse train match found during a previous interval. If no correlation is predicted, the correlation predictor 208 waits for a subsequent current interval before continuing the sub-process. However, if a correlation is predicted for the current interval, for some embodiments, the master state machine 302 may generate the PredictInterval signal 348 during the current interval.

When a correlation is predicted for the current interval (step 418), a correlation verifier 212 determines whether a pulse 114 is detected during the current interval (step 420). As a particular example, in some embodiments, the pulse detector 202 may generate a pulse detected signal 320 for the correlation verifier 212 when a pulse 114 is detected. If a pulse 114 is detected (step 420), the correlation verifier 212 verifies that correlation has been found (step 422). As a particular example, in some embodiments, the AND gate 308 may receive the pulse detected signal 320 and, based on the pulse detected signal 320 along with the PredictInterval signal 348, the AND gate 308 may generate a correlate signal 350 to indicate that the laser pulses 114 have been verified as being emitted by the designator 106.

Although FIG. 5 illustrates one example of a method 400 for performing correlation for a SAL system using the predictive correlator 112, various changes may be made to the embodiment shown in FIG. 5. For example, while shown as a series of steps, various steps in FIG. 5 could overlap, occur in parallel, occur in a different order, or occur multiple times.

Modifications, additions, or omissions may be made to the apparatuses and methods described here without departing from the scope of the disclosure. For example, the components of the apparatuses may be integrated or separated. The methods may include more, fewer, or other steps. Additionally, as described above, steps may be performed in any suitable order.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The term "each" refers to each member of a set or each member of a subset of a set. Terms such as "over" and "under" may refer to relative positions in the figures and do not denote required orientations during manufacturing or use. Terms such as "higher" and "lower" denote relative values and are not meant to imply specific values or ranges of values. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A predictive semi-active laser (SAL) pulse correlator, comprising:
  a history buffer configured to store an indicator for each of a plurality of received pulses;
  a match identifier configured to search the history buffer, based on the indicator for each of the plurality of received pulses, for a specified number of pulse matches corresponding to a pulse train match;
  a correlation predictor configured to:
    generate a TimeLow signal and a TimeHi signal, wherein the TimeLow signal and the TimeHi signal define a time window for the search by the match identifier for each pulse match of the specified number of pulse matches, wherein the TimeLow signal is provided to a low comparator and the TimeHi signal is provided to a high comparator;
    initiate the search of the history buffer for the pulse train match; and
    after identifying the pulse train match, predict, at a current time, that reception of a pulse during a future interval would verify a correlation of the pulse train match; and
  a correlation verifier configured to, in response to receiving the pulse during the future interval predicted by the correlation predictor, verify the correlation by comparing the predicted correlation to the received pulse.

2. The predictive SAL pulse correlator of claim 1, wherein at least a subset of the received pulses are emitted from a designator configured to use pulse repetition frequency (PRF) modulation to emit the pulses at a specified frequency.

3. The predictive SAL pulse correlator of claim 2, wherein the indicator comprises a timestamp, and wherein the match identifier is configured to search the history buffer for a pulse match by searching the history buffer for a timestamp corresponding to a difference between a time associated with the future interval and a multiple of a period associated with the specified frequency.

4. The predictive SAL pulse correlator of claim 1, wherein the indicator comprises a specified bit value, and further comprising an indicator spreader configured to store the specified bit value in a plurality of time bins for each of the plurality of received pulses.

5. The predictive SAL pulse correlator of claim 1, wherein the history buffer, the correlation predictor, the match identifier, and the correlation verifier are implemented in one of an application-specific integrated circuit and a field-programmable gate array.

6. A predictive semi-active laser (SAL) pulse correlator, comprising:
a circular buffer configured to store a timestamp at a corresponding address for each of a plurality of received pulses;
a successive approximation (SA) state machine configured to search the circular buffer, based on an indicator for each of the plurality of received pulses, for a specified number of pulse matches corresponding to a pulse train match;
a master state machine configured to:
generate a TimeLow signal and a TimeHi signal, wherein the TimeLow signal and the TimeHi signal define a time window for the search by the SA state machine for each pulse match of the specified number of pulse matches, wherein the TimeLow signal is provided to a low comparator and the TimeHi signal is provided to a high comparator;
initiate the search of the circular buffer for the pulse train match; and
after identifying the pulse train match, predict, at a current time, that reception of a pulse during a future interval would verify a correlation of the pulse train match; and
an AND gate configured to, in response to receiving the pulse during the future interval predicted by the master state machine, verify the correlation by comparing the predicted correlation to the received pulse.

7. The predictive SAL pulse correlator of claim 6, wherein at least a subset of the received pulses are emitted from a designator configured to use pulse repetition frequency (PRF) modulation to emit the pulses at a specified frequency.

8. The predictive SAL pulse correlator of claim 7, wherein the SA state machine is configured to search the circular buffer for the each pulse match by searching the circular buffer for a timestamp corresponding to the pulse match.

9. The predictive SAL pulse correlator of claim 8, wherein the master state machine is further configured to generate the TimeLow signal and the TimeHi signal based on a WindowSize signal received by the master state machine, wherein the WindowSize signal comprises a size for the window.

10. The predictive SAL pulse correlator of claim 9, wherein the master state machine is configured to generate the TimeLow signal and the TimeHi signal by calculating a difference between a time associated with the future interval and a multiple of a period associated with the specified frequency, subtracting a first percentage of the size of the window from the difference to generate the TimeLow signal, and adding a second percentage of the size of the window to the difference to generate the TimeHi signal.

11. The predictive SAL pulse correlator of claim 10, wherein the master state machine is further configured to receive a time signal comprising the current time and a PRF signal comprising the specified frequency, to calculate the time associated with the future interval based on the time signal, and to calculate the multiple of the period associated with the specified frequency based on the PRF signal.

12. The predictive SAL pulse correlator of claim 9, wherein the SA state machine is configured to search the circular buffer for a pulse match by generating an address for the circular buffer, and wherein the circular buffer is further configured to output a timestamp stored at the generated address, the predictive SAL pulse correlator further comprising:
the low comparator configured to determine whether the timestamp output by the circular buffer is less than the TimeLow signal; and
the high comparator configured to determine whether the timestamp output by the circular buffer is greater than the TimeHi signal.

13. The predictive SAL pulse correlator of claim 12, wherein the master state machine is configured to predict correlation for the future interval by generating a PredictInterval signal during the future interval, and wherein the AND gate is further configured to receive the PredictInterval signal generated by the master state machine, to receive a pulse detected signal when the pulse is detected, and to verify correlation when the PredictInterval signal and the pulse detected signal are received during the future interval.

14. A method for performing correlation for a semi-active laser (SAL) system, comprising:
storing an indicator for each of a plurality of received pulses;
searching the indicators for a specified number of pulse matches corresponding to a pulse train match;
for each search for one of the specified number of pulse matches, generating a TimeLow signal and a TimeHi signal to define a window for the search;
providing the TimeLow signal to a low comparator and providing the TimeHi signal to a high comparator;
after identifying the pulse train match, predicting, at a current time, that reception of a pulse during a future interval would verify a correlation of the pulse train match; and
in response to receiving the pulse during the future interval predicted, verify the correlation by comparing the predicted correlation to the received pulse.

15. The method of claim 14, wherein the indicator comprises a timestamp, wherein storing the indicators comprises storing the timestamps in a history buffer, and wherein searching the indicators comprises searching the history buffer for the specified number of pulse matches.

16. The method of claim 15, wherein at least a subset of the received pulses are emitted from a designator configured to use pulse repetition frequency (PRF) modulation to emit the pulses at a specified frequency.

17. The method of claim 16, wherein searching the history buffer for the specified number of pulse matches comprises searching the history buffer for a timestamp corresponding to a difference between a time associated with the future interval and a multiple of a period associated with the specified frequency.

18. The method of claim 15, wherein searching the history buffer for the specified number of pulse matches comprises performing a successive approximation search of the history buffer for each pulse match.

19. The method of claim 15, wherein searching the history buffer for the specified number of pulse matches comprises, for each search for one of the specified number of pulse matches, searching for a timestamp within the window for the search.

20. The method of claim 14, wherein the indicator comprises a specified bit value, and wherein storing the indicators comprises storing the specified bit value in a plurality of time bins for each of the plurality of received pulses.

* * * * *